Patented Mar. 17, 1925.

1,529,803

UNITED STATES PATENT OFFICE.

HOWARD R. MOYER AND OTHO V. STEWART, OF WILKINSBURG, PENNSYLVANIA, ASSIGNORS TO WESTINGHOUSE ELECTRIC & MANUFACTURING COMPANY, A CORPORATION OF PENNSYLVANIA.

CADMIUM-COATED MOLD.

No Drawing.   Application filed December 2, 1922.   Serial No. 604,609.

*To all whom it may concern:*

Be it known that we, HOWARD R. MOYER, a citizen of the United States, and a resident of Wilkinsburg, in the county of Allegheny and State of Pennsylvania, and OTHO V. STEWART, a citizen of the United States, and a resident of Wilkinsburg, in the county of Allegheny and State of Pennsylvania, have invented a new and useful Improvement in Cadmium-Coated Molds, of which the following is a specification.

This invention relates to molding, more particularly to a mold especially adapted for use in molding articles including phenolic condensation products in the composition thereof.

In making molded or laminated articles from fibrous material impregnated with phenolic condensation products, considerable difficulty has been experienced in that the material adhered to the mold, making it difficult to remove the article without injuring either it or the mold. To overcome this, it has been proposed to coat the surface of the mold with a composition of such a character as to prevent intimate contact of the molded article with the mold. One such composition consisted of eight parts of boiled linseed oil and four parts of red lead. This composition was applied to the mold just before each molding operation.

Although such composition is fairly well suited for the purpose, difficulty arises in that it is necessary to coat the mold before each molding operation and the workmen are often lax in providing a uniform coating over the entire molding surface so that the adhesion of the article to the mold is not entirely prevented.

Our invention obviates this difficulty, it being among the objects thereof to provide a mold having a permanent coating thereon which shall prevent an article being molded therein from adhering to said mold.

In practicing our invention, we provide a mold which may consist of a matrix and a plunger for making the ordinary molded articles or may consist of thin steel plates between which laminations of fibrous material may be molded to form laminated or plate material. A mold of this or any other character is thoroughly cleaned and is immersed in a solution adapted to deposit cadmium metal thereon. Any suitable solution may be used but we have found that one containing a cyanide of cadmium and utilizing a carbon anode is well adapted for coating either plates or mold bodies. The article to be coated is made the cathode and the plating is conducted at a current density of 40 to 50 amperes per square foot for ten to fifteen minutes.

It is only necessary to plate a very thin coating of metal on the mold and we have found that a coating of .003 inch provides a coating which is capable of resisting the heat of molding and effectively prevents the article being molded from adhering to the mold. This gives a longer life to the mold and decreases the cost of the molding operation in that it is unnecessary to coat the mold before each molding operation. Furthermore, such coating is rust-proof and it is so thin as not to materially change the dimensions of the mold. It is, therefore, possible to finish a mold to the final dimensions and then coat the same with cadmium without changing said dimensions.

Although we have described our invention, setting forth a composition and a method of plating, our invention is not limited thereto but any suitable process may be used therefor. We may dispense with the carbon anodes and substitute therefor anodes of cadmium to supply the metal for plating. If considered advisable, we may subject the plated metal to a heat treatment to alloy the cadmium with the base metal in order to increase the resistant quantities of the mold. These and other changes may be made in our invention within the scope thereof.

We claim as our invention:

1. A mold comprising a body of metal and a coating of cadmium thereon to prevent an article molded therein from adhering thereto.

2. A mold comprising a metal plate and a coating of cadmium thereon to prevent an article molded therein from adhering thereto.

3. A mold comprising a body of metal and a thin coating of cadmium thereon to prevent an article molded therein from adhering thereto.

4. A mold comprising a metal plate and a thin coating of cadmium thereon to prevent an article molded therein from adhering thereto.

5. A mold comprising a body of metal and a thin coating of cadmium alloyed therewith to prevent an article molded therein from adhering thereto.

6. A mold comprising a metal plate and a thin coating of cadmium alloyed therewith to prevent an article molded therein from adhering thereto.

In testimony whereof, we have hereunto subscribed our names this 27th day of November, 1922.

HOWARD R. MOYER.
OTHO V. STEWART.